Sept. 12, 1933. S. E. ALLEN ET AL 1,926,474
LEAK TESTER FOR GAS CONTAINERS
Filed Nov. 6, 1930 2 Sheets-Sheet 1
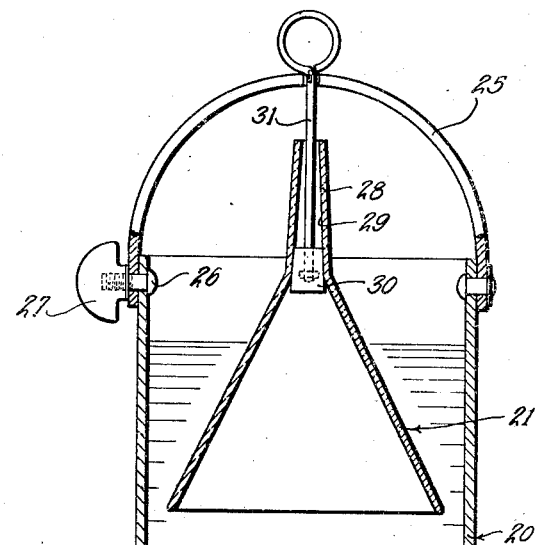
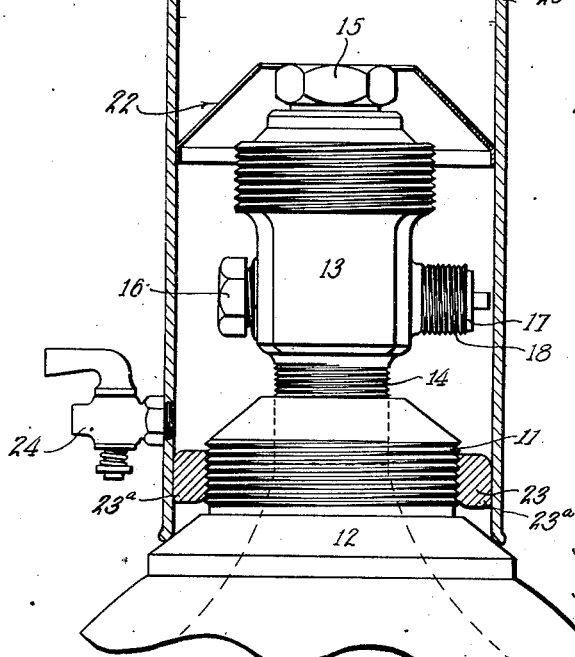
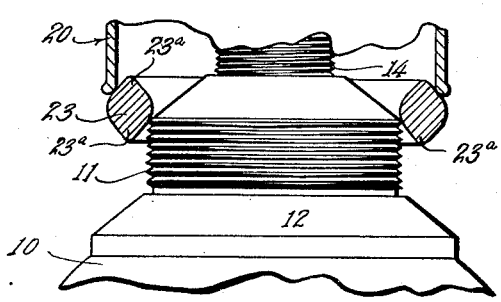
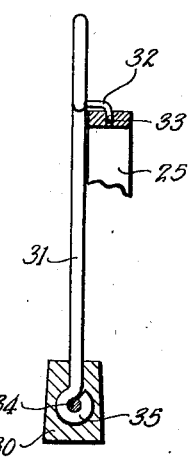
Inventors
Scott E. Allen
And Ozro N. Wiswell
By
Their Attorney

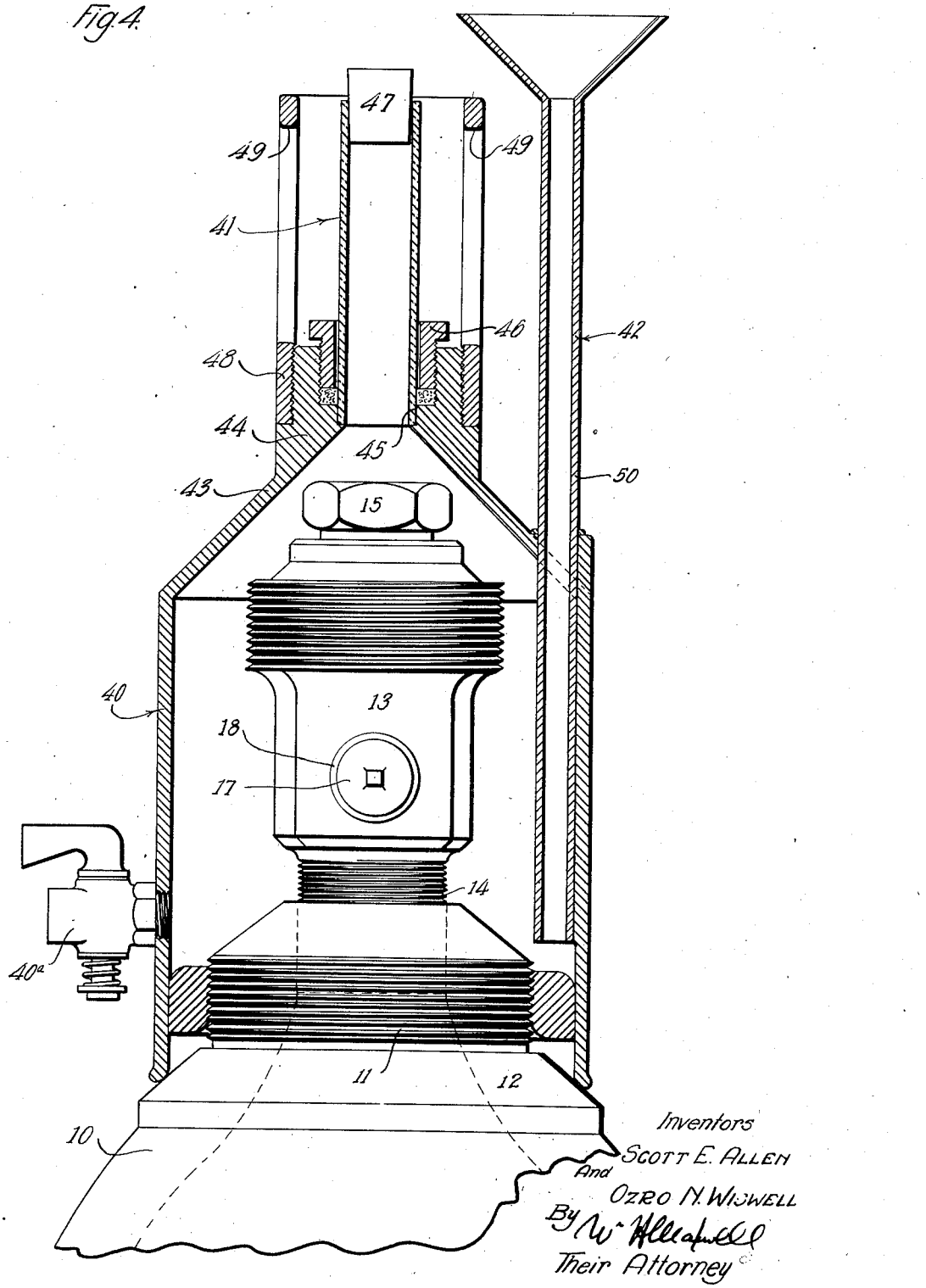

Patented Sept. 12, 1933

1,926,474

UNITED STATES PATENT OFFICE 1,926,474

LEAK TESTER FOR GAS CONTAINERS

Scott E. Allen and Ozro N. Wiswell, Los Angeles, Calif., assignors, by mesne assignments, to C-O-Two Fire Equipment Company, Newark, N. J., a corporation of Delaware Application November 6, 1930. Serial No. 493,759

21 Claims. (Cl. 73—51)

This invention relates to a leakage testing device, and relates more particularly to a device for testing gas or fluid-containing flasks or cylinders for leakage.

Various gases are contained under pressure in readily transportable flasks or cylinders. We will refer particularly to carbon dioxide gas ($CO_2$) for use in fire-extinguishing systems, etc., which is contained in cylinders of the character referred to under very high pressures. It is important to ascertain whether the gas is leaking from a cylinder after it has been filled and before it is delivered for use. It has been the common practice to submerge the entire cylinder in water to test it for leakage. The usual gas-containing cylinders for holding gas under high pressures are very large and heavy, and this manner of testing them for leaks is laborious and inconvenient.

It is a general object of the invention to provide a simple, practical, and effective device for testing a gas cylinder for leakage.

It is another object of the invention to provide a device for indicating leakage at the discharge end of a gas cylinder, and at a cylinder valve or fitting on the cylinder.

It is another object of the invention to provide a fluid or gas container tester of the character mentioned that is adapted to give indications of very slight and slow leaks.

Another object of the invention is to provide a testing device of the character mentioned that may be employed to test a gas cylinder without moving it from an upright position.

It is a further object of the invention to provide a leak indicating device of the character mentioned that is safe and convenient to use and that is simple and inexpensive of manufacture.

Other objects and features of our invention will be best and more fully understood from the following detailed description of typical forms and applications of the invention, throughout which description reference will be had to the accompanying drawings, in which:

Fig. 1 is a vertical detailed sectional view of one form of the invention, showing it mounted in position on a typical gas-containing cylinder. Fig. 2 is a view illustrating the manner of applying the device and the sealing means to the cylinder. Fig. 3 is an enlarged vertical detailed sectional view of the means for closing and suspending the trap member embodied in the invention, and Fig. 4 is a vertical detailed sectional view of another form of the invention, showing it mounted in operating position on a typical gas-containing cylinder.

The devices provided by the present invention are adapted to be employed to test various types of gas and fluid containers for leakage. The devices are particularly useful for testing cylinders containing gas under pressure, and throughout the following detailed description the invention will be disclosed in forms intended to be used on typical gas-containing flasks or cylinders. It is to be understood, however, that the invention is not to be taken as restricted to the specific forms or applications about to be described, but that it is to be taken as including any features or modifications that may fall within the scope of the claims.

The portion of the gas-containing cylinder 10 illustrated in the drawings has a reduced and rounded upper end terminating in a neck 11. The neck 11 may be screw-threaded to receive a protective cap, or the like, and is connected to, or joined with, the main portion of the cylinder by a tapered or beveled shoulder 12. The neck 11 is screw-threaded internally and externally, and is adapted to receive any suitable type of valve or fitting. In the drawings we have illustrated a typical valve fitting or cylinder valve 13, mounted on the neck 11. The valve 13 has a stem 14 on its lower end, screw-threaded into the neck 11. The valve 13 is adapted to discharge through an opening in its upper end which is normally closed by a frangible or penetrable disc (not shown). In the case illustrated, a nut 15 closes the upper end of the valve 13. The upper portion of the valve may be externally screw-threaded to receive a discharge device to cut or puncture the frangible disc. A nut or plug 16 is mounted in one side of the valve and closes a valve safety outlet means, consisting of a frangible disc which is proportioned or designed to burst at a predetermined pressure. A suitable plug 17 closes a filling inlet 18 in the opposite side of the valve. The cylinder 10 is adapted to be filled with gas under pressure through the filling inlet 18 in the side of the cylinder valve. It is to be understood that the present invention is not primarily concerned with the particular type of discharge or release means on the cylinder, nor to the valve mounted thereon; and the construction described above has been included in the disclosure merely to facilitate an understanding of a typical application of the present invention.

The form of the invention illustrated in Figs. 1 to 3 inclusive of the drawings includes, generally, a body or hood 20 adapted to be mounted on the upper end of the cylinder 10 around the valve 13, and adapted to hold water, or the like, a trap member 21 within the hood 20 for trapping gas that may leak from the neck of the cylinder or from any of the several ports on the valve 13, and a baffle 22 for directing or guiding the escaping gas bubbles into the trap 21.

The body or hood may be in the nature of a plain cylindrical tube, and is adapted to be mounted in a vertical position on the upper end of the cylinder 10. The hood 20 is proportioned to surround the cylinder valve 13 with considerable clearance and to project some distance above the top of the valve. The hood 20 is intended to hold or carry water or other suitable liquid, and may be mounted on the cylinder 10 by means of any suitable liquid-tight connection.

In certain instances, it may be desirable to use a chemical substance in the water in the hood to react with the leaking gas to indicate its pressure. The present invention provides an improved means for mounting the hood 20 on the cylinder 10 whereby it may quickly and easily be mounted on and dismounted from the cylinder. The lower end of the hood is adapted to seat on the beveled shoulder 12, and may be flared outwardly slightly as illustrated in the drawings. A gasket 23 is provided to seal between the threaded neck 11 and the interior of the hood 20. The gasket 23 is an unbroken annular member of rubber or rubber composition, or other material. The gasket is provided with diametrically opposite ribs or flanges 23ᵃ having sides tangential to the main body of the gasket, and is initially formed so that its flat sides are angularly disposed relative to a vertical plane passing through its central longitudinal axis. The ribs 23ᵃ are normally at the opposite ends of the gasket and their flat sides join the rounded periphery of the gasket. The gasket is proportioned so that its curved inner side tightly engages the neck 11 and its outer side tightly engages the hood before the hood is arranged in position on the cylinder. The cross sectional configuration and proportioning of the gasket and the manner of arranging the hood in position on the cylinder is clearly illustrated in Fig. 2 of the drawings. When the hood is arranged in position, the gasket 23 is partially twisted or turned about 180 degrees so that, when it is in its final position, it has no tendency to unroll and come off the neck, so that the hood remains firmly in place. When the hood 20 is forced down over the neck 11 to a position where its lower end seats on the beveled shoulder 12, the gasket 23 is distorted or twisted so that the flat sides of the ribs 23ᵃ tightly seal with the interior of the hood and the threaded neck, as illustrated in Fig. 1 of the drawings. The gasket 23 makes a water-tight seal between the hood and the neck 11. A suitable drain cock 24 may be provided on the hood 20 adjacent its lower end.

A bail 25 is provided on the upper end of the hood 20. The bail 25 is curved or substantially semi-circular, and its ends are pivotally attached to the hood 20. One end of the bail 25 is connected with the hood by a pivot pin 26. A thumb nut or lock nut 27 is screw-threaded onto the pin 26 to releasably set the bail 25 in position.

The trap member 21 is mounted within the upper portion of the hood 20 and is provided to catch or trap gas that may leak from the neck 11, or any of the ports of the valve 13. The trap member 21 is in the form of an inverted funnel and is made of a suitable transparent material such as glass, or the like. The funnel trap member 21 is centrally arranged in a vertical position in the upper portion of the hood 20 and is proportioned so that its large flared lower end is spaced from the inner walls of the hood. In the preferred form of the invention, the trap member 21 is normally supported so that its lower end is spaced above the top of the valve 13 and its stem 28 projects from the upper end of the hood 20. In the form of the invention illustrated in the drawings, the trap member 21 is detachably supported by the bail 25. The opening 29 in the stem 28 is tapered longitudinally, and a tapered plug or cork 30 normally closes its inner or lower end. The plug 30 is preferably formed of rubber and may be tapered to tightly fit the opening 29. A stem 31 projects upwardly from the plug 30 through the opening 29. The lower end of the stem 31 may be embedded in the plug 30. In the case illustrated, a transverse pin 34 is provided in the plug 30, and a loop 35 is provided on the stem 31 to engage around the pin 34. The pin 34 and loop 35 may be completely embedded in the plug 30. A hook 32 projects laterally from the stem 31 to engage the bail 25. The hook 32 may have a downwardly extending portion projecting into an opening 33 in the bail 25. The stem 31 supports or suspends the trap member 21 from the bail 25.

The hood 20 may be filled with water, or the like, to a level a short distance below its upper end. The trap member 21 is normally or initially completely filled with water up to the plug 30, and is preferably arranged so that its flared main portion projects above the water level in the hood 20, as illustrated in Fig. 1 of the drawings. The trap member 21 may be filled by unhooking the stem 31 from the bail 25 and pushing the plug 30 out of the opening 29. The funnel member 21 may then be submerged so that it is completely filled, and the plug 31 may be returned to the opening 29 while the member 21 is submerged. The stem 31 may then be hooked on the bail 25. The atmospheric pressure acting on the water in the hood 20 prevents the lowering of the water level in the trap member 21.

The baffle 22 is provided to direct the bubbles of leaking gas into the flared lower end of the trap member 21. The baffle 22 is mounted on the interior of the hood 20 and is in the nature of a frusto-conical part. In the preferred form of the invention, the baffle 22 is positioned so that its reduced open upper end is adjacent the upper end of the nut 15. It will be apparent how gas, leaking from the neck 11, the opening closed by the plug 17, or the opening closed by the nut 16, will be directed into the trap member 21 by the baffle 22.

It is believed that the operation of the form of the invention illustrated in Figs. 1 to 3 of the drawings will be readily apparent from the foregoing detailed description. The hood 20 is arranged on the neck 11 in the manner described above, so that the gasket makes a water-tight seal with the neck. The hood 20 may be filled with water, and the trap member 21 may be filled with water in the manner described above. In the event that gas leaks from any of the threaded openings 14, 15, 16, or 17, the bubbles of escaping gas rise upwardly and are directed into the funnel member 21 by the baffle 22. The gas entering the funnel 21 displaces the water from the funnel. As the funnel member 21 is formed of transparent material, an accumulation of gas in the member may be readily seen. In the event that there is a substantial leakage, the member 21 may be completely filled with gas which is free to pass from the lower end of the funnel member 21 and rise to the top of the hood 20.

The form of the invention illustrated in Fig. 4 of the drawings includes, generally, a body or hood 40 adapted to be mounted on the upper end of the cylinder 10 and intended to hold or carry water, or like liquid, a trap or leak-indicating tube 41 on the upper end of the hood 40, and a filling tube and safety vent 42.

The body or hood 40 is a tubular part and is adapted to be mounted on the cylinder 40 in a vertical position to surround and encase the neck 11 and the valve 13. The hood 40 is intended to carry water, or the like, and may be mounted on the cylinder 10 in the same manner as the hood 20 in the form of the invention illustrated in Figs. 1 to 3 of the drawings. The upper portion 43 of the hood is upwardly convergent or conical, and a boss 44 of round cross section is provided on the upper end of the conical portion 43. The hood 40 may be proportioned so that the upper end of the valve 13 is disposed within the conical portion 43. A drain cock 40ᵃ may be provided at the lower end portion of the hood.

The trap tube or leak-indicating tube 41 is provided to receive bubbles of gas that may leak from the neck 11 or the valve 13. The tube 41 has its lower end arranged in a central opening 45 in the upper end of the hood 40 and projects vertically upward from the hood. A suitable packing gland 46 may be provided in the opening 45 to seal around the tube 41. The tube 41 is formed of glass or other suitable transparent material. The lower end of the tube 41 is in communication with the interior of the hood 40, and the upper end of the tube is normally closed by a suitable plug 47.

The invention provides a guard or protector tube 48 to surround the tube 41. The protector tube 48 is screw-threaded onto the boss 44 and projects upwardly from the boss to encase the tube 41. Diametrically opposite longitudinal slots 49 are provided in the tube 48 through which the tube 41 may be readily seen.

The safety vent and filling means 42 includes a vertically disposed pipe or tube 50 extending into the hood 40. The tube 50 may be arranged against the inner wall of the hood 40 and may project upwardly through an opening in the wall of the conical portion 43. The lower end of the tube 50 is adjacent the lower end of the hood 40 so that gas escaping from the neck 11 or any portion of the valve 13 will not pass upwardly through it. The tube 50 may project upwardly to a point above the upper end of the tube 41, and its upper end may be flared, as illustrated in the drawings.

The hood 40 is adapted to be filled with water or other suitable liquid. The hood 40 and the tube 41 are preferably completely filled with water. In order to fill the hood 40, the plug 47 may be removed from the tube 41 and water, or the like, poured into the tube 50 until it overflows the gauge tube 41. The plug 47 may then be arranged in the upper end of the tube 41, so that the glass tube may be entirely filled with water. In the event that gas leaks from the neck 11 or the valve 13, it will rise into the tube 41 where it may be readily seen. If there is a substantial leakage, the water may be displaced from the hood 40 through the tube 50 so that there is no danger of the hood 40 or tube 41 bursting. The lower end of the tube 50 is below the level of any possible leakage point, so that leaking bubbles will not normally pass upwardly through the tube 50 but will pass upwardly into the tube 41.

It is to be noted that the present invention provides simple and effective leak-indicating devices for use on gas-containing cylinders. The forms of the invention described above are operable to indicate very small and slow leaks. The devices may be easily and quickly mounted on a cylinder and are easy to fill and empty. It is to be noted that it is not necessary to handle the cylinders 10 in any manner to use the leak-indicating devices.

Having described only typical preferred forms of our invention, we do not wish to limit ourselves to the specific details set forth, but wish to reserve to ourselves any changes or variations that may appear to those skilled in the art or fall within the scope of the following claims.

Having described our invention, we claim:

1. A leak-indicating device for use on a gas container having a neck and a fitting projecting from the neck, said device including a hood adapted to carry liquid, means for mounting the hood on the container to make a liquid tight seal therewith in a position where it surrounds the neck and fitting and a trap carried by the head for trapping gas bubbles rising in the liquid.

2. A leak-indicating device for use on a gas container having a neck and a fitting projecting from the neck, said device including a hood adapted to be mounted on the container in a position where it surrounds the neck and fitting, the hood being adapted to carry liquid, means closing the lower end of the hood and sealing with the container, and a visible trap carried by the hood for trapping gas bubbles rising in the liquid.

3. A leak-indicating device for use on a gas container having a neck and a fitting projecting from the neck, said device including a hood adapted to carry liquid, means for removably mounting the hood on the neck of the container in a position where it surrounds the neck and fitting, and a transparent visible trap normally carrying liquid in communication with the liquid in the hood and adapted to trap gas bubbles rising in the liquid.

4. A leak-indicating device for use on a gas container having a neck and a fitting projecting from the neck, said device including a hood adapted to be mounted on the container in a position where it surrounds the neck and fitting, the hood being adapted to hold a liquid, a visible trap in communication with the hood and normally filled with liquid, the upper end of the trap being open and a removable plug closing the upper end of the trap.

5. A leak-indicating device for use on a gas container having a neck and a fitting projecting from the neck, said device including a hood adapted to be mounted on the container in a position where it surrounds the neck and fitting, the hood being adapted to hold a liquid, a visible trap in communication with the hood and normally filled with liquid, and means for guiding rising gas into the trap.

6. A leak-indicating device for use on a gas container having a neck and a fitting projecting from the neck, said device including a hood adapted to be mounted on the container in a position where it surrounds the neck and fitting, the hood being adapted to hold a liquid, a visible trap in communication with the hood and normally filled with liquid, and a baffle in the hood for guiding rising gas into the trap.

7. A leak-indicating device for use on a gas container having a neck and a fitting projecting from the neck, said device including a hood adapted to be mounted on the container to surround the neck and fitting and adapted to carry a liquid, and a visible trap filled with liquid in communication with the liquid in the hood and projecting above the hood.

8. A leak-indicating device for use on a gas container, including an open-topped hood adapted to be mounted on the container and adapted to hold a liquid, an inverted transparent funnel closed at its upper end and projecting above the level of the liquid in the hood, the funnel being normally filled with fluid, and means for guiding gas into the funnel.

9. A leak-indicating device for use on a gas container, including an open-topped hood adapted to be mounted on the container and adapted to hold a liquid, an inverted transparent funnel normally filled with fluid, and means for supporting the funnel in the hood, including a bail on the hood, a removable plug closing the upper end of the funnel, and a stem projecting from the plug and suspended from the bail.

10. A leak-indicating device for use on a gas container having a neck and a valve fitting mounted thereon which includes a hood adapted to be mounted on the container in a position where it surrounds the neck and the fitting, the hood being adapted to hold a liquid, and a visible transparent trap at the upper end of the hood carrying liquid in communication with the liquid in the hood.

11. A leak-indicating device for use on a gas container having a neck and a valve fitting mounted thereon which includes a hood adapted to be mounted on the container in a position where it surrounds the neck and the fitting, the hood being adapted to hold a liquid, a visible transparent trap at the upper end of the hood carrying liquid in communication with the liquid in the hood, and a frusto-conical baffle in the hood at the upper end of the fitting for guiding gas into the trap.

12. A leak-indicating device for use on a gas container, having a neck and a valve fitting mounted thereon, which includes a hood adapted to be mounted on the container in a position where it surrounds the neck and the fitting, the hood being adapted to hold a liquid, a visible trap at the upper end of the hood carrying a liquid, and means for detachably mounting the hood on the container including a gasket to seal between the hood and the neck of the container.

13. A leak-indicating device for use on a gas container having a neck and a valve fitting mounted thereon, which includes a hood adapted to be mounted on the container in a position where it surrounds the neck and the fitting, the hood being adapted to hold a liquid, a visible trap at the upper end of the hood carrying liquid, and means for detachably mounting the hood on the container, including a gasket to seal between the hood and the neck of the container, the gasket being adapted to be rolled into position when the hood is mounted on the container.

14. A leak-indicating device for use on a gas container having a neck and a valve fitting mounted thereon, which includes a hood adapted to be mounted on the container in a position where it surrounds the neck and the fitting, the hood being adapted to hold a liquid, a visible trap at the upper end of the hood carrying liquid, and means for detachably mounting the hood on the container including a gasket to seal between the hood and the neck of the container, the gasket normally having ribs at its ends with angularly related sides, the gasket being adapted to be rolled to a position between the neck and the interior of the hood where it is distorted and the said sides of the ribs are forced against the neck and interior surface of the hood.

15. A leak-indicating device for use on a gas container having a neck and a valve fitting mounted thereon, which includes a hood adapted to be mounted on the container in a position where it surrounds the neck and the fitting, the hood being adapted to hold a liquid, there being an opening in the upper end of the hood, and a transparent trap communicating with said opening and projecting from the upper end of the hood.

16. A leak-indicating device for used on a gas container having a neck and a valve fitting mounted thereon, which includes a hood adapted to be mounted on the container in a position where it surrounds the neck and the fitting, the hood being adapted to hold a liquid, there being an opening in the upper end of the hood, a transparent trap communicating with said opening and projecting from the upper end of the hood, and a guard around the trap.

17. A leak-indicating device for use on a gas container having a neck and a valve fitting mounted thereon which includes a hood adapted to be mounted on the container in a position where it surrounds the neck and the fitting, the hood being adapted to hold a liquid, there being an opening in the upper end of the hood, a transparent trap tube extending into said opening and projecting from the top of the hood, and a vent tube extending into the hood and having its lower end at the bottom of the hood.

18. A leak indicating device for use on a gas container including, a tubular body adapted to surround an end portion of the container and adapted to hold a liquid, means adjacent the lower end of the body for sealing between the container and the interior of the body, a bail for the body, and a trap suspended from the bail for trapping gas rising in the liquid in the body.

19. A leak indicating device for use on a gas container including, a hood adapted to be mounted on the container and adapted to contain a liquid, there being an opening in the upper end of the hood, and a trap in communication with said opening and adapted to carry liquid, the upper interior walls of the hood being inclined upwardly toward said opening to guide rising gas into the opening and trap.

20. A leak indicating device for use on a gas container including, a hood adapted to be mounted on the container and adapted to contain a liquid, there being an opening in the upper end of the hood, a trap having an open lower end submerged in the liquid in the hood, the periphery of the trap being spaced from the inner walls of the hood, and a baffle in the hood between the upper end of the container and the trap for guiding rising gas into the trap.

21. A leak indicating device for use on a container having a neck and a valve fitting on the neck, which indicating device includes a hood adapted to hold a liquid, means detachably mounting the hood on the neck in a position where it surrounds the neck and the fitting, and a trap carried by the hood for trapping gas rising in the liquid in the hood.

SCOTT E. ALLEN.
OZRO N. WISWELL.